United States Patent [19]
Lancelot, III

[11] Patent Number: 6,099,196
[45] Date of Patent: Aug. 8, 2000

[54] TAPER LOCK REBAR SPLICE JOINT

[75] Inventor: Harry B. Lancelot, III, Hurst, Tex.

[73] Assignee: Dayton Superior Corporation, Miamisburg, Ohio

[21] Appl. No.: 09/321,146

[22] Filed: May 27, 1999

Related U.S. Application Data

[62] Division of application No. 08/982,780, Dec. 2, 1997, Pat. No. 5,967,691.

[51] Int. Cl.$^7$ ........................................................ F16B 2/02
[52] U.S. Cl. .......................... 403/313; 403/300; 403/344; 403/314; 403/334; 52/726.1
[58] Field of Search ..................................... 403/313, 309, 403/310, 307, 344, 311, 314, 300, 299, 296, 293, 292, 305, 333, 334; 52/726.1, 740.1

[56] References Cited

U.S. PATENT DOCUMENTS

| | | |
|---|---|---|
| 368,764 | 8/1887 | Hammer . |
| 1,377,101 | 5/1921 | Sparling . |
| 3,638,978 | 2/1972 | Guntermann . |
| 3,679,250 | 7/1972 | Marsden . |
| 3,850,535 | 11/1974 | Howlett et al. . |
| 4,143,986 | 3/1979 | Antosh . |
| 4,469,465 | 9/1984 | Andrus . |
| 5,152,118 | 10/1992 | Lancelot . |
| 5,193,932 | 3/1993 | Wu . |
| 5,308,184 | 5/1994 | Bernard . |
| 5,411,347 | 5/1995 | Bowmer et al. . |
| 5,606,839 | 3/1997 | Baumann . |

*Primary Examiner*—Terry Lee Melius
*Assistant Examiner*—William L. Miller
*Attorney, Agent, or Firm*—Natan Epstein; Beehler & Pavitt

[57] ABSTRACT

A splice for concrete reinforcement bars includes two diametrically opposed half-shells spanning the aligned ends of the rebars. The half-shells interlock with upset bar ends to hold the bars together. An internally tapered sleeve is forced axially over the tapered exterior of the half-shells in a taper lock to secure the splice joint.

9 Claims, 4 Drawing Sheets

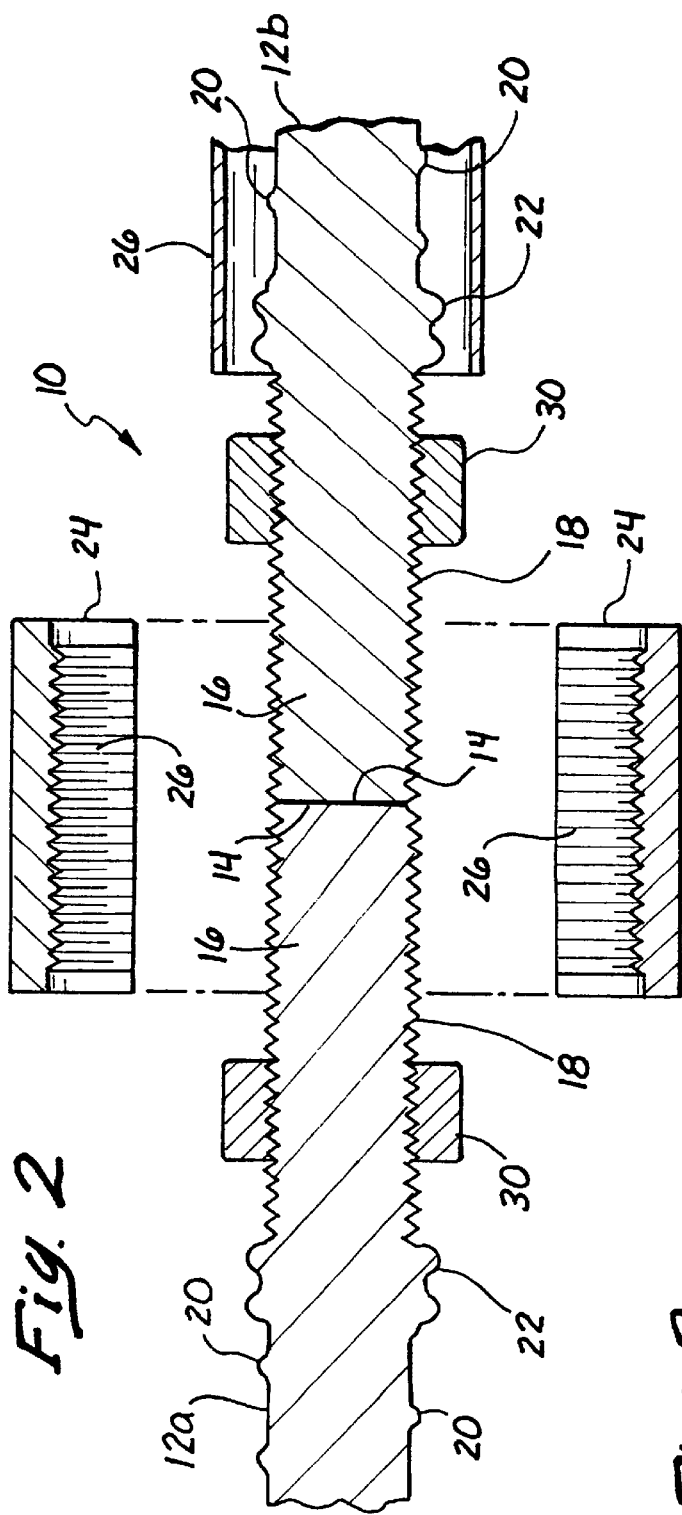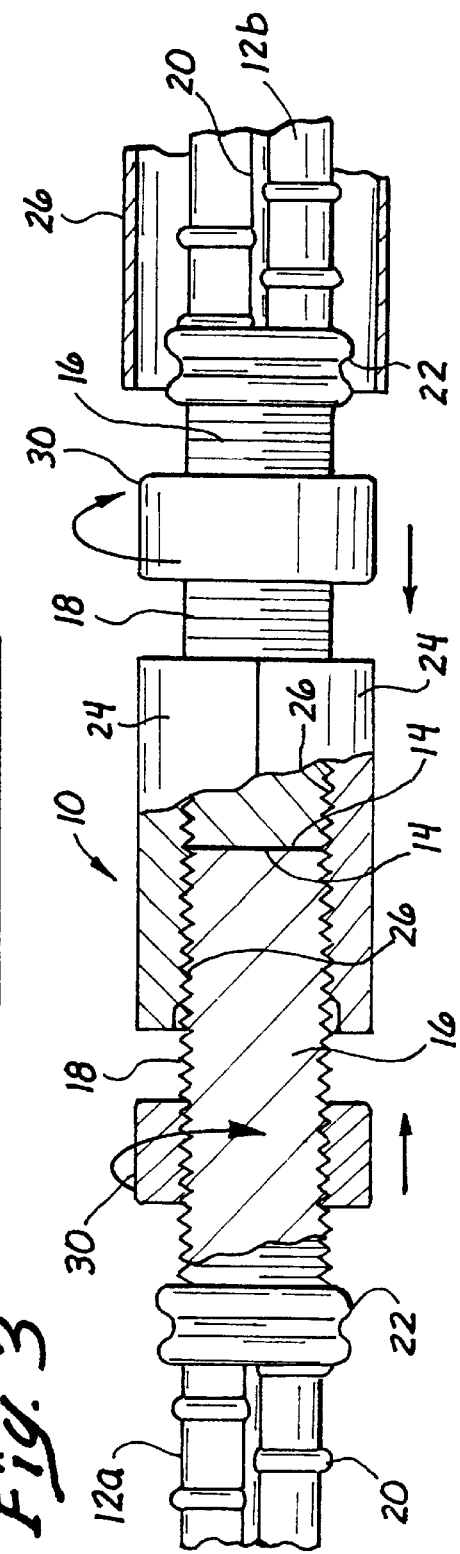

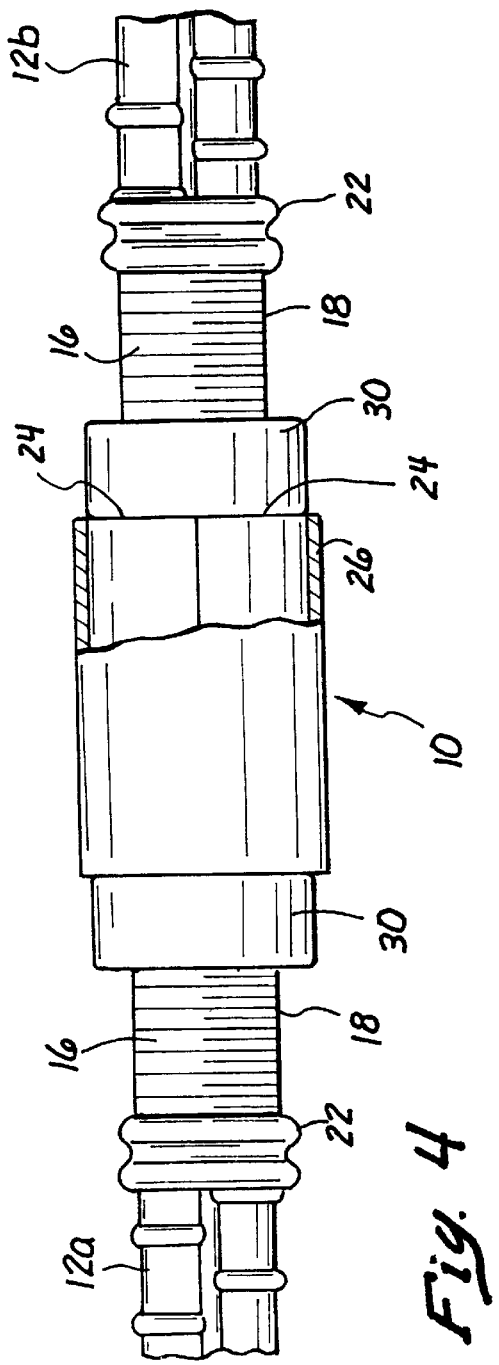
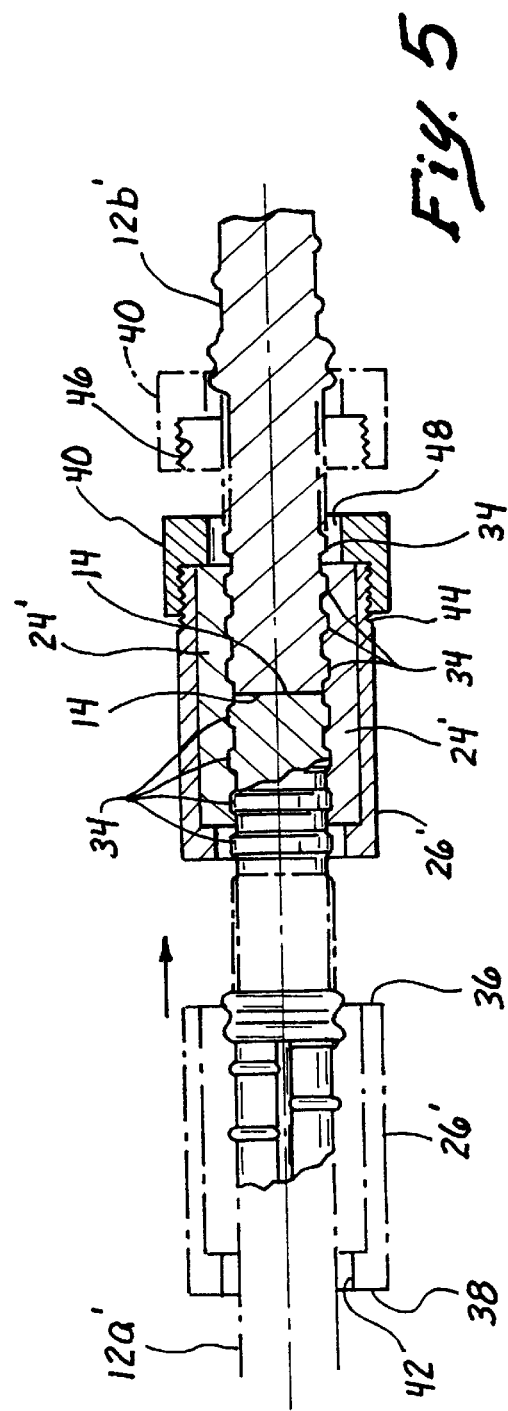

TAPER LOCK REBAR SPLICE JOINT

This application is a division of Ser. No. 08/982,780 filed Dec. 2, 1997, now U.S. Pat. No. 5,967,691.

FIELD OF THE INVENTION

This invention pertains to the field of concrete reinforcement bars used in poured concrete construction, and more particularly relates to a splice system for joining such bars without turning either bar being joined.

STATE OF THE PRIOR ART

Steel reinforcement bars used in poured concrete construction often need to be joined end-to-end so as to make up a longer bar length having mechanical characteristics approximating those of a single continuous bar of equivalent length. Conventionally, such splices are made by means of an internally threaded sleeve which makes screwing engagement with each of the two bar ends to be joined. Such a splice requires that at least one of the bars be rotated relative to the splice sleeve. The sleeve can be easily turned and screwed on the first bar end, but in order to complete the splice joint it is then necessary to either turn the other bar or both the first bar together with the sleeve screwed on its end. This may require turning by hand long, heavy and cumbersome steel bars, sometimes under difficult field conditions. This process multiplied by hundreds or thousands of splice joints in a given construction project adds a considerable labor component to the job and also lengthens construction time. Also, splice joints are sometimes needed where it is physically impossible to rotate either bar. This may occur where a first bar is already embedded in concrete while the second bar is bent at an angle with a long bar length extending radially to the splice axis. In such case, it is usually not possible to turn the bent bar because of physical barriers, such as the ground or other structural elements.

For these and other reasons, a continuing need exists for a dependable concrete reinforcement bar splice system which can be installed quickly without turning either of the two bars being joined.

SUMMARY OF THE INVENTION

According to this invention a quick connect splice is provided for making an end-to-end splice joint between two axially aligned concrete reinforcement bars of the type having raised surface portions. The novel splice has at least two shell sections radially assembled to the aligned bars, each of the shell sections extending axially partially over each of the bars. A sleeve encompasses the shell sections against radial separation from the bars. The sleeve, the shell sections and the bars have opposing surfaces which cooperate for urging the bars axially together responsive to axial urging of the sleeve onto the shell sections, as in a taper lock between the sleeve and the shell sections. The opposing surfaces may comprise a conical tapered interior surface on the sleeve for making frictional locking engagement with a conical surface defined by the shell sections thereby to make the aforementioned taper lock. The opposing surfaces may further comprise raised surface portions on the bars and conforming surface portions defined on the shell sections for locking the shell sections against axial or longitudinal displacement relative to the bars. The raised surface portions may comprise an upset end portion of each of the bars, and the conforming surface portions of the shell sections may comprise a pair of opposed interior shoulders containing therebetween the upset end portions of the bars. Each upset end portion may have an end surface, the end surfaces of the upset portions being urged against each other by a taper on the opposed interior shoulders.

Desirably, the sleeve applies radially compressive force against the shell sections thereby to urge the opposed interior shoulders against the upset end portions such that the compressive force is translated into axial force urging the end surfaces of the bars against each other. That is, the sleeve applies radially compressive force against the shell sections thereby to urge against each other opposing surfaces defined on the shell sections and the bars, the opposing surfaces being configured such that the compressive force is translated into axial force urging end surfaces of the bars against each other. At least some of the opposing surfaces are tapered at an angle oblique to a longitudinal axis of the bars in order to facilitate translation of the radial to axial force.

These and other features, advantages and improvements according to this invention will be better understood by reference to the following detailed description of the preferred embodiments taken in conjunction with the accompanying drawings.

BRIEF DESCRIPTION OF THE DRAWINGS

FIG. 2 is a longitudinal sectional view of the splice of FIG. 1 prior to assembly;

FIG. 3 is a side view, partly in section, of the splice of FIG. 1 in partially assembled condition;

FIG. 4 is a side view, partly in section, of the splice of FIG. 1 in fully assembled condition;

FIG. 5 is a longitudinal side view, partly in section, of a first alternate embodiment of the new splice.

DETAILED DESCRIPTION OF THE PREFERRED EMBODIMENTS

Figure 1:
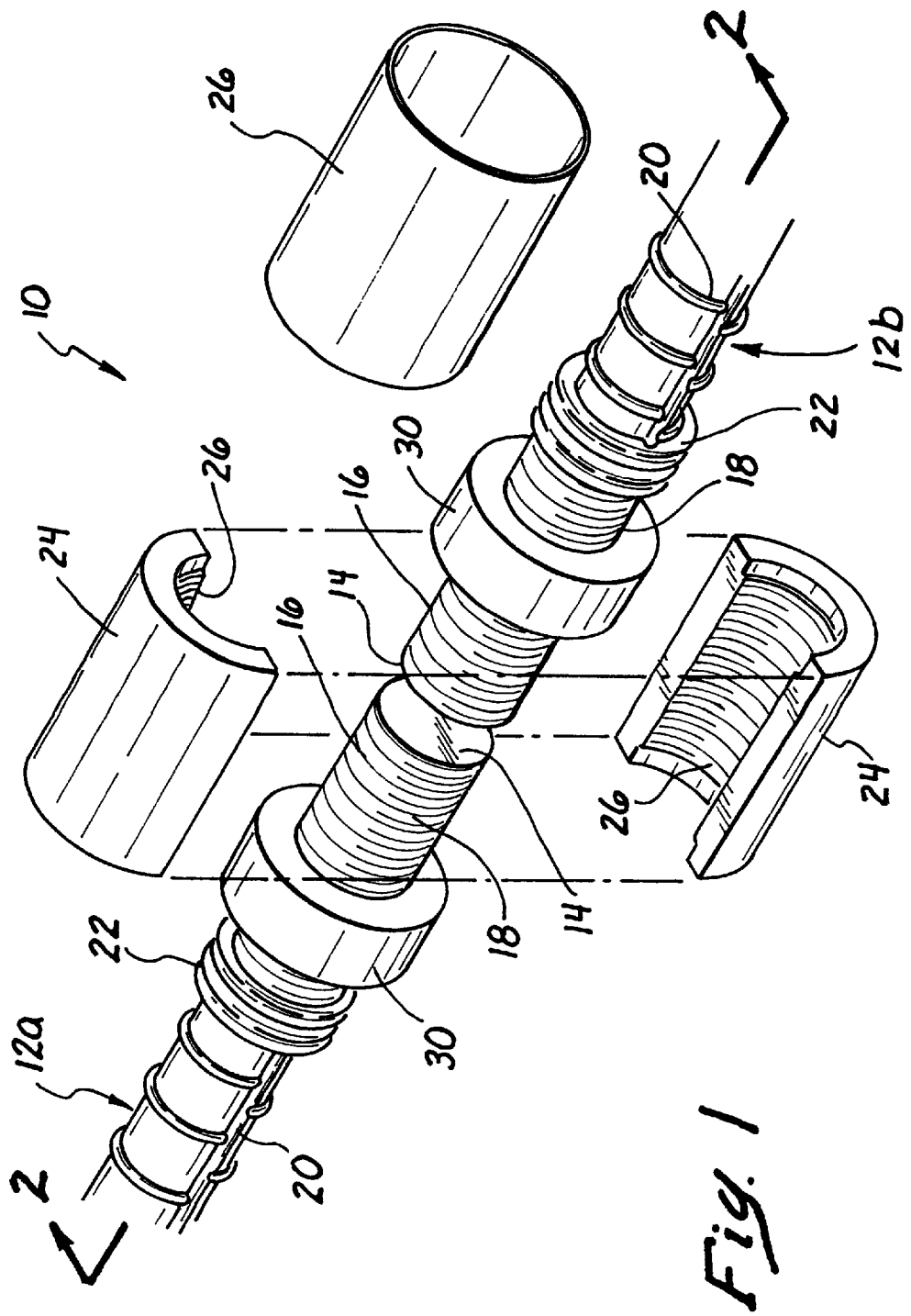
FIG. 1 is an exploded perspective view of a presently preferred form of the novel bar splice.

With reference to the drawings in which like numerals designate like elements, a splice joint, generally designated by the numeral 10, between two axially aligned generally cylindrical concrete reinforcement steel bars 12a, 12b, each of which has an end portion 16 terminating at bar end or end face 14. The end portion 16 is threaded with a conventional machine or screw thread 18. In the illustrated embodiment the end portions 16 are attached to the corresponding bars 12a, 12b by a friction welding process which results in annular extrusions 22 at the weld joint. However, the particular manner of forming or attaching the threaded end portions to the main body of the bar is not part of the present invention and any convenient method of providing the threaded end portions 16 on the two bars may be used. For example, the screw threads 18 can be produced on forged bar stock in a manner which is well known in the art. The main body of each reinforcement bar has surface deformations 20 in the form of longitudinal and circumferential ridges which may of conventional design and serve to anchor the bar in a mass of poured concrete.

The splice joint assembly 10 includes a pair of approximately semi-cylindrical half shells 24, each of which has a semi-cylindrical interior surface 26 with a thread pattern complementary to the thread 18 on the bars 12a, 12b. The half shells 24 are assembled to the two bars so as to bridge the opposite, aligned ends 14 of the two bars to be spliced, as best understood by reference to FIGS. 2 and 3. The two half shells 24 are applied to the aligned bars 12 in a radial direction and in diametrically opposed relationship, so as to approximate a cylinder radially encompassing and axially bridging the ends 14 of the two bars. Raised portions of the thread pattern 26 of the half shells mates into grooves of the thread pattern 18 on the bars, as illustrated in FIG. 3, making interlocking engagement in an axial direction between each half shell 24 and both bars 12a, 12b. An outer sleeve 26, previously slipped axially onto one bar, bar 12b for example, is then slid onto the assembled half shells 24, to the position shown in FIG. 4, circumferentially encompassing the half shells for securing the half shells in axially interlocking engagement with the two bars and against radial separation from the bars.

The splice joint 10 is preloaded in an axial direction by means of two locking nuts 30, each threaded on a corresponding one of the two bars 12a, 12b. The nuts shown are cylindrical in shape, although nuts of other shapes may be used, and have an outside diameter smaller than the inside diameter of the outer sleeve 26, so that the sleeve 26 may slip axially over the nuts and away from the bar ends 14, as shown in FIG. 2, in order to permit assembly of the half shells 24 to the axially aligned bar ends. Prior to assembly of the half shells, it is desirable, but not essential that the end faces 14 of the aligned bars be in mutual contact, as shown in FIGS. 2 and 3.

The nuts 30 are turned and advanced along the threaded portions 16 up against opposite sides of the assembled half shells 24 and tightened so as to tension the bars apart from each other against the restraint of the assembled half-shells 24. This tensioning has the effect of reducing or largely eliminating free play in the splice joint 10 which otherwise might occur due to surface roughness and imperfections in the thread surfaces of both the bar thread 18 and the half shell thread 26. Axial loading of the bars relative to the assembled half shells tends to eliminate gaps and improve contact between opposing thread surfaces in the splice joint, thereby distributing the load on the threads over a greater thread surface area. The net effect is that the mechanical characteristics of the resulting splice joint more closely approach those of a continuous reinforcement bar.

The axial length of the half shells 24 should be, at a minimum, such as to provide sufficient thread contact area to carry the anticipated maximum tension load to be carried by the splice joint. The two half shells 24 can be conveniently made by longitudinally halving an internally threaded cylindrical sleeve. All components of the splice joint 10 are made of suitable high strength metal or metal alloys such as those commonly employed in the manufacture of steel reinforcements for cast concrete construction.

Turning now to FIG. 5, a first alternate embodiment of the splice joint is illustrated which differs from the presently preferred embodiment of FIGS. 1–4 in that the two concrete reinforcement bars 12a', 12b' have raised annular ridges 34 instead of the helical screw thread 18 of the previously described embodiment. The two half shells 24' in FIG. 5 are analogous to half shells 24 in FIGS. 1–4, except in that the interior surface of the half shells 24' has spaced apart radial grooves shaped and dimensioned so as to mate onto the annular ridges 34 of the two bars and thereby make axial interlocking engagement with the bars. That is, when the half shells 24' are applied in diametrically opposed relationship to the bars, so as to bridge the opposed end faces 14 of the two bars, the assembled half shells can be rotated about the bars but cannot be displaced axially along the bars. The two half shells 24' are held in assembled position about the two bars 12a', 12b' by an outer cylindrical sleeve 26' which has an open end 36 and an opposite end 38 which is of reduced aperture by an annular lip 42. The open end 36 has an exterior thread 44 onto which is screwed a locking nut 40 having a complementary interior thread 46, and a central aperture 48. Prior to assembly the sleeve 26' and locking nut 40 are spaced apart as suggested in phantom lining in FIG. 5, to permit application of the two half shells 24' to the ridged end portions of the two bars 12a', 12b'. The sleeve 26' is then slid axially along bar 12a' to the solid lined position, and the locking nut 40 is similarly displaced axially along bar 12b', also to the solid line position. The two pieces 26', 40 are then screwed to each other, so as to contain between them the assembled half shells 24', securing the two half shells against separation from the two reinforcement bars and thereby making the splice joint.

Figure 6:
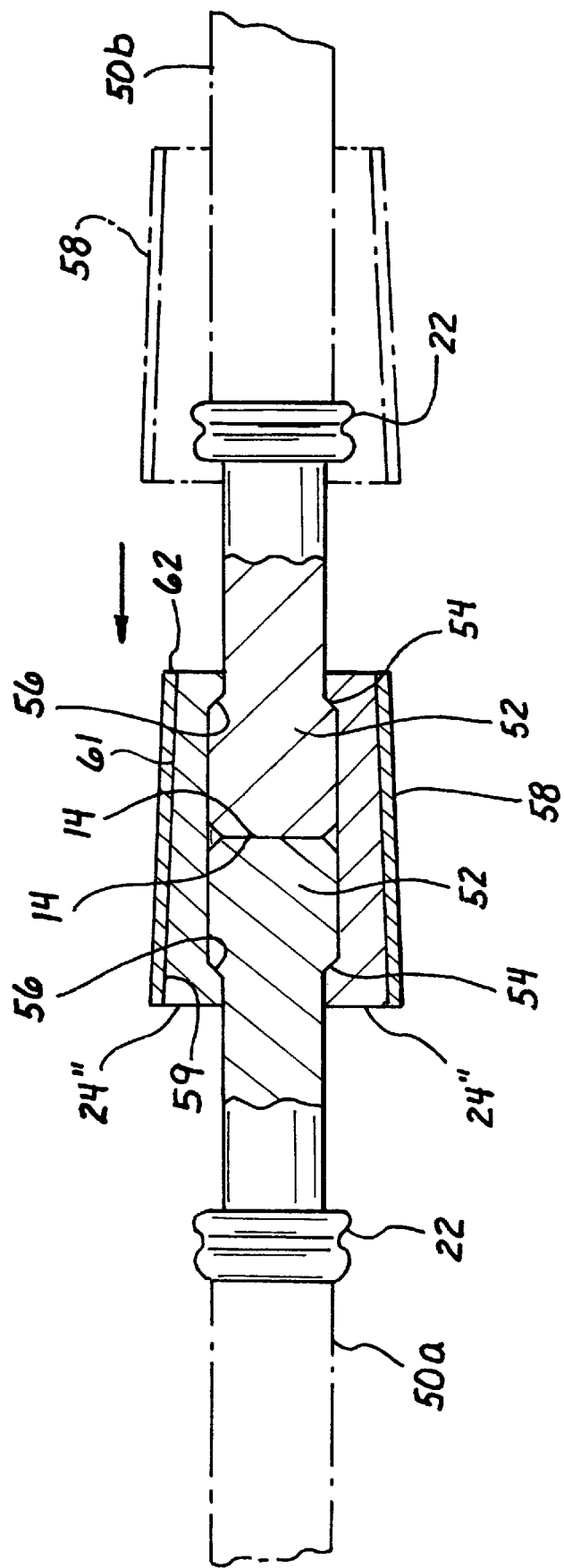
FIG. 6 is a longitudinal side view, partly in section, of a second alternate embodiment of the new splice.

FIG. 6 illustrates a second alternate embodiment of the splice joint in which the screw thread 18 of FIGS. 1–4 is replaced by an upset end 52 of enlarged diameter which defines an annular shoulder 54 on each reinforcement bar 50a, 50b. Two half shells 24", each of semi-cylindrical shape and having an inner surface with two internal shoulders 56 which complement and mate with the bar shoulders 54, are applied in diametrically opposed relationship to the two bars bridging the end faces 14 of the axially aligned bars 50a, 50b. The interior shoulders 56 of each half shell make axial interlocking engagement with the bar shoulders 54 and prevent axial separation of the bar ends. The two half shells 24" are secured in interlocking position with the two bars by means of an outer shell 58 which is advanced from the phantom line position to the solid line position in FIG. 6. The sleeve 58 has a tapered interior surface 59 a slight conical taper which matches a similar exterior conical taper exterior tapered surface 61 of the assembled half shells 24". The inside dimensions of the tapered sleeve 58 are such as to make a taper lock engagement with the half shells when the narrow end 62 of the sleeve is tapped, as by means of a hammer, towards the wide end of the assembled half shells, to secure the splice joint.

It will be appreciated that this invention is not limited to only two semi-cylindrical shell elements for joining the bar ends. More than two shell elements may be used, for example three or four cylindrically curved elements may be applied around the two bars and held together by an outer sleeve. Also, the two or more shell elements may be hingedly joined to each other, for example in the form of a clamshell, or otherwise flexibly interconnected so as to allow application of the shell elements to the bars as earlier described.

While a preferred and several alternate embodiments of the present invention have been described and illustrated for purposes of clarity and example, it should be understood that still other changes, modifications and substitutions will become apparent to those having ordinary skill in the art without thereby departing from the scope and spirit of the invention defined by the following claims.

What is claimed is:

1. A quick connect splice for making an end-to-end splice joint, comprising:

two axially aligned concrete reinforcement bars having raised surface portions;

at least two shell sections radially assembled to said bars in axially interlocking relationship with said bars, each of said shell sections extending axially partially over each of said bars, said shell sections defining a tapered exterior surface;

a sleeve circumferentially encompassing said shell sections against radial separation from said bars and defining a tapered interior surface opposing said tapered exterior surface;

said tapered exterior surface and said tapered interior surface being adapted for frictionally engaging with each other in a taper lock responsive to axial urging of said sleeve against said shell sections without rotation of the sleeve thereby to secure the sleeve in radially containing relationship about said shell sections.

2. The quick connect splice of claim 1 wherein said opposing surfaces further comprise raised surface portions on said bars and conforming surface portions defined on said shell sections for locking said shell sections against longitudinal displacement relative to said bars in said axially interlocking relationship.

3. The quick connect splice of claim 2 wherein said raised surface portions comprise an upset end portion of each of said bars.

4. The quick connect splice of claim 3 wherein said conforming surface portions of said shell sections comprise a pair of opposed interior shoulders containing therebetween the upset end portions of said bars.

5. The quick connect splice of claim 4 wherein each said upset end portion has an end surface, the end surfaces of said upset portions being urged against each other by a taper on said opposed interior shoulders.

6. The quick connect splice of claim 5 wherein said sleeve applies radially compressive force against said shell sections thereby to urge said opposed interior shoulders against said upset portions such that said compressive force is translated into axial force urging said end surfaces of said bars against each other.

7. The quick connect splice of claim 1 wherein said sleeve applies radially compressive force against said shell sections thereby to urge against each other opposing surfaces defined on said shell sections and said bars, said opposing surfaces being configured such that said compressive force is translated into axial force urging end surfaces of said bars against each other.

8. A splice joint, comprising:

two axially aligned concrete reinforcement bars each having an upset end portion of enlarged diameter;

a pair of shell sections radially assembled to said bars in axially interlocking relationship with said upset end portion of each of said bars, each of said shell sections extending axially partially over each of said bars, said shell sections defining a generally conical tapered exterior surface; and a sleeve circumferentially encompassing said shell sections against radial separation from said bars and defining a generally conical tapered interior surface opposing said tapered exterior surface;

said sleeve being urged into a taper lock with said shell sections by frictional engagement of said tapered exterior surface and said tapered interior surface for radially containing said shell sections in axial interlocking engagement with said bars thereby to secure the bars in a splice joint.

9. A method for making a splice joint between two concrete reinforcement bars, each bar having raised surface portions, comprising the steps of:

axially aligning the concrete reinforcement bars;

assembling at least two shell sections radially in axially interlocking relationship with said bars, each of said shell sections extending axially partially over each of said bars, said shell sections defining a tapered exterior surface;

providing a sleeve circumferentially encompassing said shell sections against radial separation from said bars and defining a tapered interior surface opposing said tapered exterior surface; and axially urging said sleeve against said shell sections without rotation of the sleeve thereby to frictionally secure the sleeve about said shell sections in a taper lock.

* * * * *